United States Patent
Miyairi et al.

(10) Patent No.: US 11,970,961 B2
(45) Date of Patent: Apr. 30, 2024

(54) HONEYCOMB STRUCTURE, EXHAUST GAS PURIFYING DEVICE AND EXHAUST SYSTEM

(71) Applicant: NGK INSULATORS, LTD., Nagoya (JP)

(72) Inventors: Yukio Miyairi, Nagoya (JP); Masaaki Masuda, Nagoya (JP); Kyohei Kato, Nagoya (JP); Norihiro Wakida, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 295 days.

(21) Appl. No.: 17/303,040

(22) Filed: May 19, 2021

(65) Prior Publication Data
US 2021/0293166 A1    Sep. 23, 2021

Related U.S. Application Data

(63) Continuation of application No. PCT/JP2019/034019, filed on Aug. 29, 2019.

(30) Foreign Application Priority Data

Nov. 30, 2018  (JP) ................................ 2018-225820
Feb. 8, 2019   (JP) ................................ 2019-022107

(51) Int. Cl.
*F01N 3/022*   (2006.01)
*F01N 3/28*    (2006.01)
(Continued)

(52) U.S. Cl.
CPC ......... *F01N 3/0222* (2013.01); *F01N 3/2828* (2013.01); *F01N 3/101* (2013.01);
(Continued)

(58) Field of Classification Search
None
See application file for complete search history.

(56) References Cited

U.S. PATENT DOCUMENTS

2003/0086839 A1*  5/2003  Rivin ................ H01M 8/04225
                                                422/186.01
2006/0032203 A1   2/2006  Komori et al.
(Continued)

FOREIGN PATENT DOCUMENTS

JP   H11-336534 A1   12/1999
JP   2006-057584 A    3/2006
(Continued)

OTHER PUBLICATIONS

Machine translation of WO 2016021186 A1 via Espacenet (translated May 5, 2023) (Year: 2016).*
(Continued)

*Primary Examiner* — Elizabeth Collister
(74) *Attorney, Agent, or Firm* — BURR PATENT LAW, PLLC

(57) ABSTRACT

A pillar shaped honeycomb structure, including: a porous partition wall that define a plurality of cells, the plurality of cells forming flow paths for a fluid, the plurality of cells extending from an inflow end face to an outflow end face; and an outer peripheral wall located at the outermost circumference. The plurality of cells include: a plurality of first cells; and a plurality of second cells having a lower cross-sectional area than that of the plurality of first cells. An interior of each of the second cells is filled with a material comprising a magnetic substance. Each of the second cells are arranged adjacent to at least one of the first cells.

17 Claims, 17 Drawing Sheets

(51) Int. Cl.
*F01N 3/10* (2006.01)
*F01N 3/20* (2006.01)

(52) U.S. Cl.
CPC ............ *F01N 3/103* (2013.01); *F01N 3/2066* (2013.01); *F01N 2230/04* (2013.01); *F01N 2240/05* (2013.01); *F01N 2330/06* (2013.01); *F01N 2330/30* (2013.01)

(56) References Cited

U.S. PATENT DOCUMENTS

| | | | |
|---|---|---|---|
| 2009/0136387 A1* | 5/2009 | Picton | ................ B60R 13/0884 422/112 |
| 2015/0037532 A1 | 2/2015 | Shibata et al. | |
| 2017/0022868 A1 | 1/2017 | Crawford et al. | |

FOREIGN PATENT DOCUMENTS

| | | |
|---|---|---|
| JP | 5261256 B2 | 8/2013 |
| JP | 2015-029939 A1 | 2/2015 |
| WO | 2004/111398 A1 | 12/2004 |
| WO | 2016/021186 A1 | 2/2016 |

OTHER PUBLICATIONS

International Search Report and Written Opinion (Application No. PCT/JP2019/034019) dated Oct. 21, 2019.
Chinese Office Action dated Jan. 6, 2023 (Application No. 201980067465.X).
English translation of the International Preliminary Report on Patentability (Chapter I) dated May 25, 2021 (Application No. PCT/JP2019/034019).

* cited by examiner

HONEYCOMB STRUCTURE, EXHAUST GAS PURIFYING DEVICE AND EXHAUST SYSTEM

FIELD OF THE INVENTION

The present invention relates to a honeycomb structure, an exhaust gas purifying device and an exhaust system. More particularly, the present invention relates to a honeycomb structure, an exhaust gas purifying device, and an exhaust system, which can both suppress an increase in pressure loss and achieve good heating efficiency of a honeycomb structure.

BACKGROUND OF THE INVENTION

Exhaust gases from motor vehicles typically contain harmful components such as carbon monoxide, hydrocarbons and nitrogen oxides and/or fine particles of carbon or the like as a result of incomplete combustion. From the viewpoint of reducing health hazards to a human body, there is an increasing need for reducing harmful gas components and fine particles in exhaust gases from motor vehicles. At the present time, the reduction of harmful gas components and fine particles in the emission extremely close to zero is also required for fine particles emitted from gasoline engines which are the mainstream of power sources for motor vehicles. There is also the same need for fine particles in exhaust gases from diesel engines.

In order to satisfy such a need, it is necessary to reduce emission as much as possible, which is discharged without being purified by a catalyst before reaching a catalytic activity temperature. For example, measures using an electric heating technique are known in the art.

As such a technique, Patent literature 1 proposes a method of passing an electric current through a conductive honeycomb structure itself and heating the honeycomb structure itself by the Joule heat. However, the technique disclosed in Patent Literature 1 causes a problem that an electric short circuit occurs when condensed water is generated in an exhaust gas in an exhaust gas pipe, because electricity is passed through the honeycomb structure. There is also a problem that an electric short circuit occurs due to accumulation of carbon fine particles.

On the other hand, as a heating technique that can be used in an environment where condensed water is generated and can be used even under conditions where carbon fine particles are deposited, Patent Literature 2 proposes a method of induction heating by means of a coil configured to select some of non-conductive honeycomb cells and insert a metal wire into the selected cells to go around an outer peripheral surface of a honeycomb structure, without passing electric current through the honeycomb structure itself.

CITATION LIST

Patent Literatures

[Patent Literature 1] Japanese Patent No. 5261256 B
[Patent Literature 2] U.S. Patent Application Publication No. 2017/0022868 A1

SUMMARY OF THE INVENTION

However, as a result of studies, the present inventors have found that the application of the technique disclosed in Patent Literature 2 to a catalyst-supported honeycomb or a honeycomb structure filter increases a heating efficiency as the number of cells into which the metal wire is inserted is increased, but decreases the number of cells that can be used as gas flow paths and decreases an area of the fluid flow paths, causing a significant increase in pressure loss. On the other hand, as the number of cells into which the metal wire is inserted is lower, the pressure loss is decreased, but it leads to a lower heating efficiency. Further, looking at the illustrations of FIGS. 4 and 5 for the structures of the honeycomb cells of Patent Literature 2 from such a viewpoint, one metal wire is inserted every five cells or seven cells in view of the above problems. Therefore, it is considered that a design is made in view of a balance between suppression of the increase in pressure loss and the heating efficiency.

As described above, recently, the emission of harmful gas components and fine particles emitted from gasoline engines and diesel engines has been required at a level as close to zero as possible. In order to fulfill such a requirement, the heating efficiency of the catalyst-supported honeycomb and the honeycomb structure filter must be further improved, while at the same time suppressing the increase in pressure loss. However, in the technique disclosed in Patent Literature 2, there is a trade-off relationship between the improvement of the heating efficiency of the catalyst and the suppression of the increase in pressure loss. Therefore, there is a need for improving both the removal of harmful gas components and the removal of fine particles in the exhaust gas, in order to fulfill the recent higher level requirement of both.

An object of the present invention is to provide a honeycomb structure, an exhaust gas purifying device, and an exhaust system, which can both suppress an increase in pressure loss and achieve a good heating efficiency of a honeycomb structure.

As a result of intensive studies, the present inventors have found that the above problems can be solved by providing second cells having a lower cross-sectional area that that of first cells of a honeycomb structure, the first cells serving as flow paths for a fluid, filling the interior of each second cell with a material containing a magnetic substance, and arranging each of the second cells adjacent to at least one of the first cells. Thus, the present invention is specified as follows.

(1)
A pillar shaped honeycomb structure, comprising:
a porous partition wall that defines a plurality of cells, the plurality of cells forming flow paths for a fluid, the plurality of cells extending from an inflow end face that is an end face on an inflow side of the fluid to an outflow end face that is an end face on an outflow side of the fluid; and
an outer peripheral wall located at the outermost circumference;
wherein the plurality of cells comprise:
a plurality of first cells; and
a plurality of second cells having a lower cross-sectional area than that of the plurality of first cells,
wherein an interior of each of the second cells is filled with a material comprising a magnetic substance, and
wherein each of the second cells are arranged adjacent to at least one of the first cells.

(2)
An exhaust gas purifying device, comprising:
the honeycomb structure according to (1); and a coil wiring that spirally surrounds an outer circumference of the honeycomb structure.

(3)

An exhaust system, comprising:
an exhaust muffler;
the exhaust gas purifying device according to (2), the exhaust gas purifying device being provided in the exhaust muffler; and
a silencer provided in the exhaust muffler.

According to the present invention, it is possible to provide a honeycomb structure, an exhaust gas purifying device, and an exhaust system, which can both suppress an increase in pressure loss and achieve a good heating efficiency of a honeycomb structure.

DETAILED DESCRIPTION OF THE INVENTION

Hereinafter, embodiments of honeycomb structures according to the present invention will be described with reference to the drawings. However, the present invention is not limited to these embodiments, and various changes, modifications, and improvements may be made based on knowledge of those skilled in the art, without departing from the scope of the present invention.

(1. Honeycomb Structure)

Figure 1:
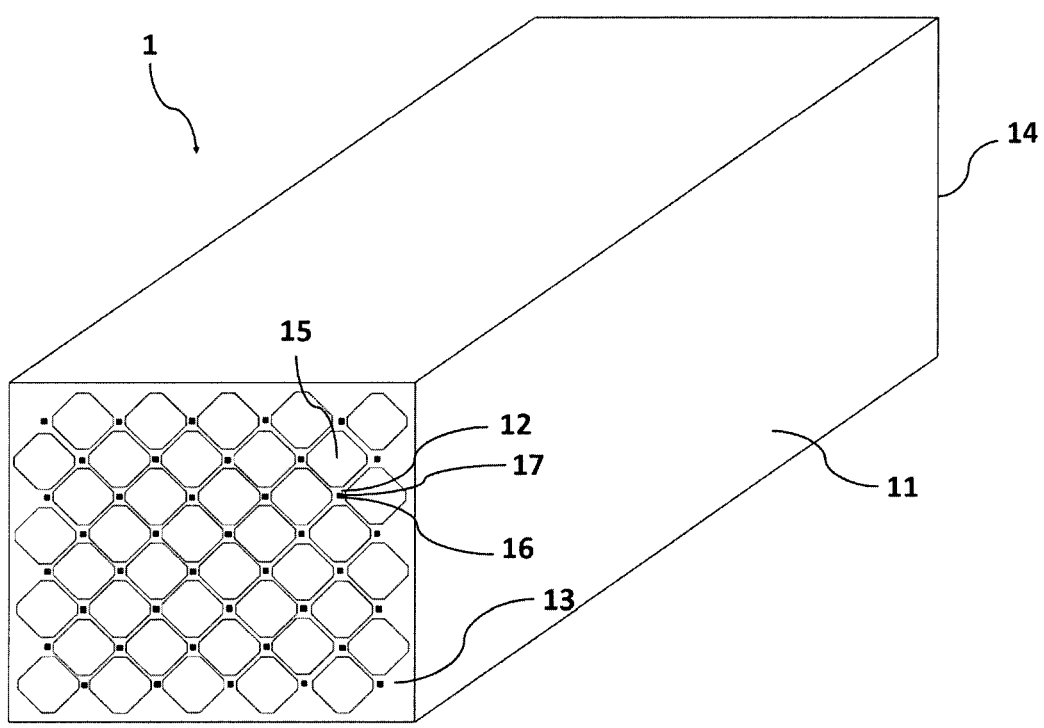
FIG. 1 is a perspective view schematically illustrating a honeycomb structure according to an embodiment of the present invention.

FIG. 1 shows a perspective view schematically illustrating a honeycomb structure 1 according to an embodiment of the present invention. The honeycomb structure 1 illustrated has a pillar shape. The honeycomb structure 1 includes porous partition walls that define a plurality of cells extending from an inflow end face 13, which is an end face on an inflow side of a fluid, to an outflow end face 14, which is an end face on an outflow side of the fluid, to form flow paths for a fluid; and an outer peripheral wall 11 located on the outermost circumference. The plurality of cells include: a plurality of first cells 15; and a plurality of second cells 16.

Figure 2:
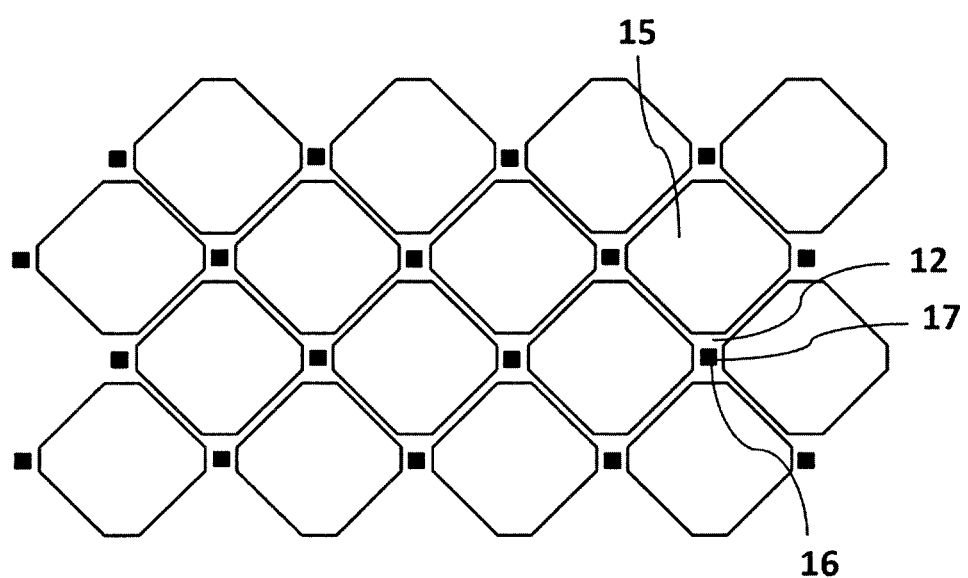
FIG. 2 is a cross-sectional view schematically illustrating a cross section of a part of first cells, second cells, and partition walls of a honeycomb structure shown in FIG. 1, which cross section is perpendicular to a cell extending direction (a gas flow direction).

FIG. 2 schematically illustrates a cross section of a part of the first cells 15, the second cells 16 and the partition walls 12 of the honeycomb structure 1 according to an embodiment of the present invention, which cross section is perpendicular to a cell extending direction (a gas flow direction). The first cells 15 form flow paths for a fluid. A cross-sectional shape of each first cell 15 is formed into an octagon having eight corner portions in total, such that each corner portion of a quadrangle is removed to form two new corner portions. Each of the plurality of first cells 15 has such an octagonal shape, and the first cells 15 are regularly arranged in the same direction as the outermost circumference of the honeycomb structure 1.

The second cells 16 have a lower cross-sectional area than that of the first cells 15, and the interior of each second cell 16 is filled with a material 17 containing a magnetic substance. Here, the "filled" may be a state where the material 17 containing the magnetic substance is tightly packed inside the second cells 16, or may be a state where the interior of each second cell 16 has gaps (spaces having no material 17 containing the magnetic substance). Each of the second cells 16 is arranged adjacent to at least one of the first cells 15. According to such a configuration, the material 17 containing the magnetic substance is filled in the second cells 16 arranged adjacent to at least one of the first cells 15, so that the honeycomb structure 1 is heated by electromagnetic induction. Therefore, it is not necessary to pass electricity through the honeycomb structure 1 itself, so that any occurrence of a short circuit can be suppressed even in an environment where condensed water is generated. Further, since the second cells 16 having a lower cross-sectional area than that of the first cells 15 are filled with the material 17 containing the magnetic substance, there is no need to sacrifice the flow path by filling the first cells 15 serving as the flow paths for the fluid with the material 17 containing the magnetic substance. This can allow both suppress of an increase in pressure loss of the honeycomb structure 1 and the good heating efficiency to be achieved at the same time. Further, when purifying the harmful gas components in the exhaust gas with a catalyst, the honeycomb structure having such configurations can allow a temperature of the catalyst to be rapidly heated to a catalyst active temperature or more by electric heating at the time when a gasoline engine or a diesel engine is started. Unless otherwise specified, the "cross-sectional area" of the cells as used herein refers to "an area in a cross section orthogonal to a central axis of the honeycomb structure (a honeycomb structure extending direction)".

Each of the first cells 15 has a polygonal opening, and the plurality of second cells 16 may be arranged adjacent to at least one corner portion of the polygonal opening of each of the plurality of first cells 15. According to such a configuration, the plurality of first cells 15 can be easily arranged so as to have a close-packed structure in the cross section of the honeycomb structure 1, and the second cells 16 filled with the material 17 containing the magnetic substance can be arranged adjacent to the first cells without sacrificing the first cells 15 forming the flow paths for the fluid or with minimized reduction in the cross-sectional area of the first cells 15. Therefore, it is possible to suppress an increase in the pressure loss of the honeycomb structure 1 and further improve the heating efficiency of the honeycomb structure. Further, since the corner portions of the first cells 15 are also portions where a catalyst wash coat for thinly impregnating a catalyst component to be provided inside the first cells 15 tends to be unevenly distributed when the catalyst is supported, the provision of the second cells 16 filled with the material 17 containing the magnetic substance near the corner portions results in an enhanced effect of improving a purification rate by heating the catalyst.

In the structure shown in FIG. 2, two corner portions of each of the first cells 15 are arranged so as to face each other in the four adjacent first cells 15, and one second cell 16 is provided in a region surrounded by the two corner portions (total eight corner portions) of each of the four adjacent first cells 15. In other words, each of the first cells 15 is arranged adjacent to at least one of the second cells 16. According to such a configuration, each of the second cells 16 is arranged adjacent to at least one of the first cells 15, and at the same time, each of the first cells 15 is arranged adjacent to at least one of the second cells 16, so that the heating efficiency of the honeycomb structure 1 can be further improved.

Figure 4:
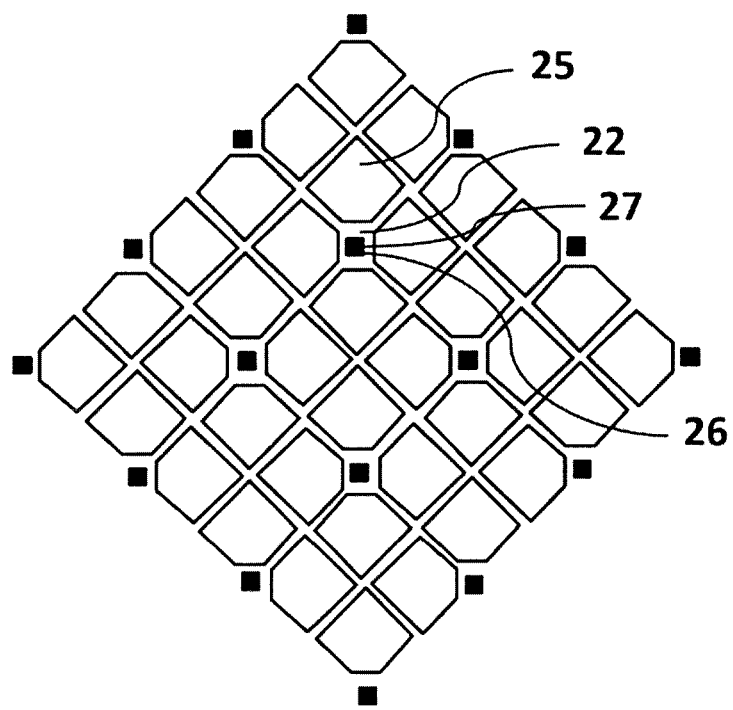
FIG. 4 is a cross-sectional view schematically illustrating a cross section of a part of first cells, second cells, and partition walls of a honeycomb structure according to an embodiment of the present invention, which cross section is perpendicular to a cell extending direction (a gas flow direction).
Figure 5:
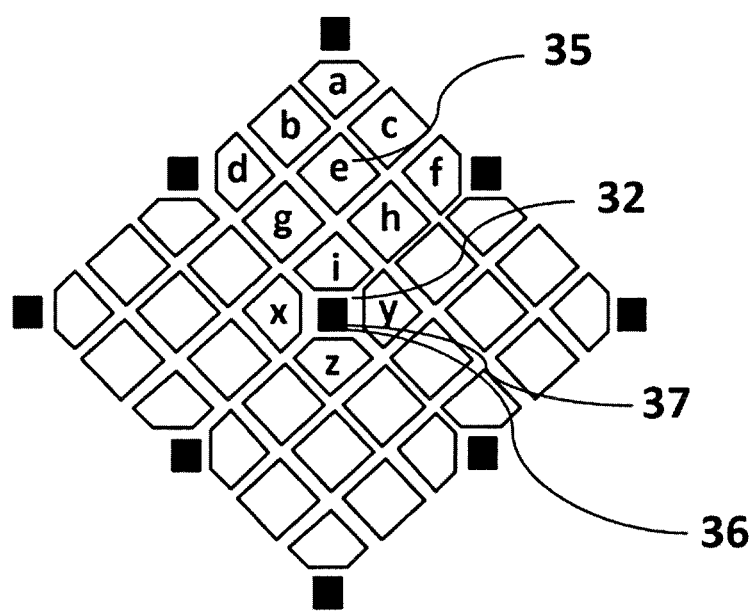
FIG. 5 is a cross-sectional view schematically illustrating a cross section of a part of first cells, second cells, and partition walls of a honeycomb structure according to an embodiment of the present invention, which cross section is perpendicular to a cell extending direction (a gas flow direction).

The arrangement of the first cells, the second cells, and the partition walls is not limited to that disclosed in FIG. 2, and alternatively, it may be a staggered arrangement where the first cells and the second cells are alternately arranged vertically and horizontally. Further, the arrangement as shown in FIGS. 4 and 5 may be used. In the arrangement as shown in FIG. 4, the cross-sectional shape of each first cell 25 is formed into a pentagonal shape having five corner portions in total, such that one corner portion in the quadrangle is removed to form new two corner portions. All of the first cells 25 have such a pentagonal shape, and are regularly arranged in the same direction as the outermost circumference of the honeycomb structure 1. The four adjacent first cells 25 are arranged such that the two corner portions newly formed by removing one corner portion are opposed to each other, and one second cell 26 filled with a material 27 containing a magnetic substance is provided in a region surrounded by two corner portions (total eight corner portions) of each of the four adjacent first cells 25.

In the arrangement as shown in FIG. 5, three first cells and three first cells each having a substantially quadrangular shape are aligned in vertical and horizontal directions, respectively, to arrange the nine cells in total, which form a first cell group having a substantially quadrangular shape as a whole. For example, in FIG. 5, the nine first cells 35 of the first cells 35a to 35i form the first cell group having the substantially quadrangular shape. That is, the first cells are composed of two types of cells having different cross-sectional shapes: the quadrangular cells 35b, 35c, 35e, 35h, 35g; and the pentagonal cells 35a, 35d, 35f, and 35i. The second cells 36 have a lower cross-sectional area than that of all the first cells. The first cell group has such a substantially quadrangular shape as a whole, and is regularly arranged in the same direction as the outermost circumference of the honeycomb structure 1. Each of the first cells 35a, 35d, 35f, and 35i arranged at the four corners of the first cell group having the substantially quadrangle has two corner portions in such a form that one corner portion is removed to form new two corner portions. In other words, more particularly, the first cell group having the substantially quadrangle has eight corner portions in total, and can be said to be formed into an octagonal shape, because one corner portion of each of the first cells 35a, 35d, 35f, and 35i arranged at the corner is removed to have two corner portions. Four adjacent first cell groups are arranged such that the above two corner portions in such a form that one corner portion is removed to form the new two corner portions face each other. For example, FIG. 5 shows four substantially quadrangular first cell groups in which the two corner portions of the first cells 35i, 35x, 35y, and 35z located at the respective corners are opposed to each other. One second cell 36 filled with the material 37 containing the magnetic substance is provided in a region surrounded by the two corner portions (total eight corner portions) of each of the four adjacent first cells.

The arrangement of the first cells, the second cells and the partition walls is not limited to that illustrated in each of FIGS. 2, 4 and 5, as long as each of the second cells is arranged adjacent to at least one of the first cells. The shapes of the first cells and the second cells may be preferably polygonal such as a triangle, a quadrangle, a pentagon, a hexagon, and an octagon; circular, or elliptical in a cross section orthogonal to the central axis, or other non-defined shapes, although not particularly limited thereto. The number, arrangement, shape, and the like of the first cells and the second cells, the thickness of the partition walls, and the like are not limited, and they can be appropriately designed as needed.

The cross-sectional area of the second cells 16 is not particularly limited as long as it is lower than that of the first cells 15. Preferably, a ratio of the cross-sectional area of the second cells 16 to the total cross-sectional area of the first cells 15 and the second cells 16 is 10% or less. According to such a configuration, it is possible to further suppress an increase in pressure loss while maintaining good heating efficiency of the honeycomb structure 1. The ratio of the cross-sectional area of the second cells 16 to the total cross-sectional area of the first cells 15 and the second cells 16 is more preferably 8% or less, and even more preferably 5% or less. The lower limit of the ratio of the cross-sectional area of the second cells 16 to the total cross-sectional area of the first cells 15 and the second cells 16 may be typically 1% or more, or 2% or more, although it depends on a degree of heating efficiency of the honeycomb structure 1.

It is preferable that an equivalent hydraulic diameter of the first cells 15 is at least twice those of the second cells 16. According to such a configuration, it is possible to further suppress an increase in pressure loss while maintaining good heating efficiency of the honeycomb structure 1. The equivalent hydraulic diameter of the first cells 15 is preferably 5 times or more, and even more preferably 8 times or more, that of the second cells 16.

The material 17 containing the magnetic substance to be filled in the second cells 16 is composed of the magnetic substance and a matrix containing the magnetic substance. The matrix may be, for example, a material containing a metal or glass as a main component, or a material containing silica or alumina as a main component, or a material further containing an organic substance or an inorganic substance in that material, although not particularly limited thereto. Further, only the magnetic substance may be filled in the second cells 16.

The magnetic substance may have needle shape or particulate shape, although not particularly limited thereto. When the needle-shaped magnetic substance is used, the material 17 containing one needle-shaped magnetic material such as a metal wire may be filled in the second cells 16, or the material 17 containing a plurality of needle-shaped magnetic substances may be filled in the second cells 16. When the particulate-shaped magnetic substance is used, a particle size of the magnetic substance is appropriately set within a range equal to or less than the diameter of each second cell 16. More particularly, the magnetic substance preferably has a weight average particle size of 20 μm or less. The lower limit of the weight average particle size of the magnetic substance is not particularly set, but it may be, for example, 0.5 μm or more. It should be noted that the weight average particle size is measured by a laser diffraction type particle size distribution measuring device. Further, powder composed of the particulate-shaped magnetic substance alone may be filled in the second cells 16, or composite powder of the magnetic substance and other materials such as glass may be filled in the second cells 16. The powder filled in the second cells 16 may be in a state where the powder is coated onto the partition walls in the second cells 16. When the powder is thus used as the material 17 containing the magnetic substance, the induction heating frequency is set to be higher (for example, set to 100 kHz or higher) than when the material 17 containing the wire-shaped magnetic substance is used, so that temperature rising rate performance equivalent to that of the material 17 containing the needle-shaped magnetic substance can be obtained.

The magnetic substance preferably has a Curie point of 700° C. or more, although not particularly limited thereto. The Curie point of the magnetic substance of 700° C. or more can enable a honeycomb temperature sufficient to increase the catalyst temperature to the catalytic activity temperature or more to be reached. Further, this can lead to ease to burn out and remove PMs (particulate matters) collected in the first cells 15 to regenerate a honeycomb structure filter. As the magnetic material having a curry point of 700° C. or more, an alloy containing Fe or Co as a main component is suitable, and specific compositions include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-1% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; and the like. Here, the Curie point of the magnetic substance refers to a temperature at which a ferromagnetic property is lost.

Although materials of the partition walls 12 and the outer peripheral wall 11 of the honeycomb structure 1 are not particularly limited, the honeycomb structure is required to be a porous body having a large number of pores. Therefore, the honeycomb structure is typically formed of a ceramic material. Examples of the ceramic material include a sintered body of ceramics comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 1 contains silicon carbide in an amount of 50% by mass or more of the entire honeycomb structure 1. The phrase "the honeycomb structure 1 is mainly based on a silicon-silicon carbide composite material" means that the honeycomb structure 1 contains 90% by mass or more of the silicon-silicon carbide composite material (total mass) based on the entire honeycomb structure 1. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 1 is mainly based on silicon carbide" means that the honeycomb structure 1 contains 90% by mass or more of silicon carbide (total mass) based on the entire honeycomb structure 1.

Preferably, the ceramic material is at least one of cordierite, silicon carbide, aluminum titanate, silicon nitride, mullite, or alumina.

Further, an outer shape of the honeycomb structure 1 may be, but not particularly limited to, a shape such as a pillar shape with circular end faces (circular pillar shape), a pillar shape with oval end faces, and a pillar shape with polygonal (square, pentagonal, hexagonal, heptagonal, octagonal, and the like) end faces, and the like. Furthermore, the size of the honeycomb structure 1 is not particularly limited, and an axial length of the honeycomb structure 1 is preferably from 40 to 500 mm. Further, for example, when the outer shape of the honeycomb structure 1 is cylindrical, a radius of each end face is preferably from 50 to 500 mm.

The partition walls 12 of the honeycomb structure 1 preferably have a thickness of from 0.20 to 0.50 mm, and more preferably from 0.25 to 0.45 mm, in terms of ease of production. For example, the thickness of 0.20 mm or more improves the strength of the honeycomb structure 1. The thickness of 0.50 mm or less can result in lower pressure loss when the honeycomb structure 1 is used as a filter. It should be noted that the thickness of the partition walls 12 is an average value measured by a method for observing the axial cross section with a microscope.

Further, each partition wall 12 forming the honeycomb structure 1 preferably has a porosity of from 25 to 70%. When used as a honeycomb structure for a catalyst support in which a gas passes through the cells, the porosity is preferably from 25% to 40% from the viewpoint of maintaining strength with a thinner wall. When used as a honeycomb structure having plugged portions (hereinafter, also referred to as a "wall flow type particulate filter"), the porosity is more preferably from 40 to 65%, in terms of ease of production. When used as the wall flow type particulate filter, the porosity of 30% or more tends to decrease a pressure loss, and the porosity of 70% or less can maintain the strength of the honeycomb structure 1.

The porous partition walls 12 preferably have an average pore size of from 0.5 to 10 μm, because when used as the honeycomb structure for the catalyst support in which the gas passes through the cells, the gas does not pass through the partition walls. Further, when used as the wall flow type particulate filter, the average pore size is preferably from 5 to 30 μm, and more preferably from 10 to 25 μm. The average pore size of 5 μm or more can decrease the pressure loss when the honeycomb structure is used as a filter. The average pore size of 30 μm or less can maintain the strength of the honeycomb structure 1. As used herein, the terms "average pore diameter" and "porosity" mean an average pore diameter and a porosity measured by mercury porosimetry, respectively.

The first cells 15 of honeycomb structure 1 preferably have a cell density in a range of from 5 to 63 cells/cm$^2$, and more preferably in a range of from 31 to 54 cells/cm$^2$, although not particularly limited thereto.

Such a honeycomb structure 1 is produced by forming a green body containing a ceramic raw material into a honeycomb shape having partition walls 12 that penetrate from one end face to other end face and define a plurality of cells to form flow paths for a fluid, to form a honeycomb formed body, and drying the honeycomb formed body and then firing it. When such a honeycomb structure 1 is used as the honeycomb structure 1 according to the present embodiment, the outer peripheral wall may be integrally extruded with a honeycomb structure portion, which is used as the outer peripheral wall as it is, or an outer circumference of the honeycomb formed body (honeycomb structure 1) may be ground and shaped into a predetermined shape after forming or firing it, and a coating material may be applied to the outer circumference-ground honeycomb structure 1 to form an outer peripheral coating. In the honeycomb structure 1 of this embodiment, for example, a honeycomb structure 1 having an outer circumference without grinding the outermost circumference of the honeycomb structure 1 may be used, and the coating material may be further applied onto the outer peripheral surface of the honeycomb structure 1 having the outer circumference (that is, a further outer side of the outer circumference of the honeycomb structure 1) to form the outer coating. That is, in the former case, only the outer peripheral coating made of the coating material forms the outer peripheral surface of the honeycomb structure 1 positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure 1. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 1 is not limited to an integral type honeycomb structure in which the partition walls 12 are integrally formed. For example, the honeycomb structure 1 may be a honeycomb structure in which pillar shaped honeycomb segments each having a plurality of cells defined by porous partition walls 12 to form flow paths for a fluid are combined via joining material layers (which, hereinafter, may be referred to as a "joined honeycomb structure").

Figure 3:
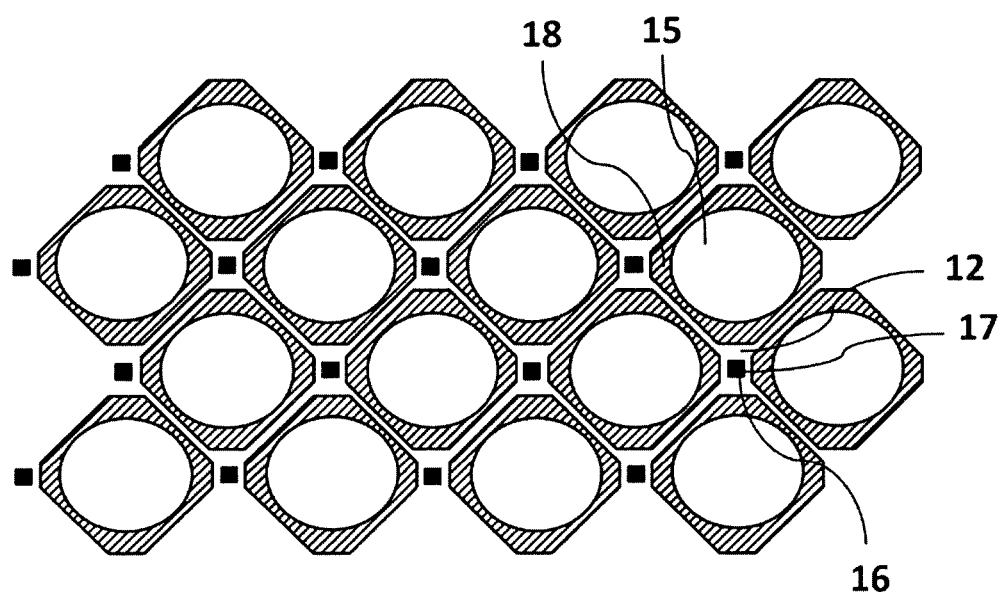
FIG. 3 is a cross-sectional view schematically illustrating a cross section of a part of first cells, second cells, and partition walls of a honeycomb structure according to an embodiment of the present invention, the partition walls forming inner walls of the first cells and having a catalyst on the surfaces, which cross section is perpendicular to a cell extending direction (a gas flow direction).

The honeycomb structure 1 according to the present embodiment may have a catalyst 18 provided on the surfaces of the porous partition walls 12 that form inner walls of the first cells 15. FIG. 3 shows a cross-sectional view schematically illustrating a cross section of a part of the first cells 15, the second cells 16, and the partition walls 12 which form the inner walls of the first cells 15 of the honeycomb structure 1 and which have the catalyst 18 provided on the surfaces, which cross section is perpendicular to the cell extending direction (the gas flow direction). Thus, the honeycomb structure 1 according to the present embodiment may be structured as a catalyst support having a supported catalyst, and as a filter (for example, a diesel particulate filter (hereinafter also referred to as "DPF") including plugged portions for purifying particulate matters (carbon fine particles) in an exhaust gas.

A type of the catalyst is not particularly limited, and it can be appropriately selected according to the use purposes and applications of the honeycomb structure. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a lean nitrogen oxides trap catalyst (LNT catalyst) containing an alkaline earth metal and platinum as storage components for nitrogen oxides (NO$_x$). Illustrative examples of a catalyst that does not use the noble metal include a NO$_x$ selective catalytic reduction catalyst (SCR catalyst) containing a copper-substituted or iron-substituted zeolite, and the like. Also, two or more catalysts of those catalysts may be used. A method for supporting the catalyst is not particularly limited, and it can be carried out according to a conventional method for supporting the catalyst on the honeycomb structure.

Using each of fired honeycomb structures as a honeycomb segment, the side faces of the plurality of honeycomb segments can be joined with a joining material so as to be integrated to provide a honeycomb structure in which the honeycomb segments are joined. For example, the honeycomb structure in which the honeycomb segments are joined can be produced as follows. The joining material is applied to joining surfaces (side surfaces) of each honeycomb segment while attaching joining material adhesion preventing masks to both end faces of each honeycomb segment.

These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a pillar shape), and the coating material may be applied to the outer peripheral surface, and then heated and dried to form an outer peripheral wall.

The material of the joining material adhesion preventing mask that can be suitably used includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used include an adhesive film having a thickness of from 20 to 50 μm.

The joining material that can be used may be prepared by, for example, ceramic powder, a dispersion medium (for example, water or the like), and optionally additives such as a binder, a deflocculant and a foaming resin. The ceramics may be preferably ceramics containing at least one of cordierite, mullite, zircon, aluminum titanate, silicon carbide, silicon nitride, zirconia, spinel, indialite, sapphirine, corundum, or titanic. Further, the joining material has the same material as that of the honeycomb structure. The binder includes polyvinyl alcohol, methyl cellulose, CMC (carboxymethyl cellulose) and the like.

Figure 6:
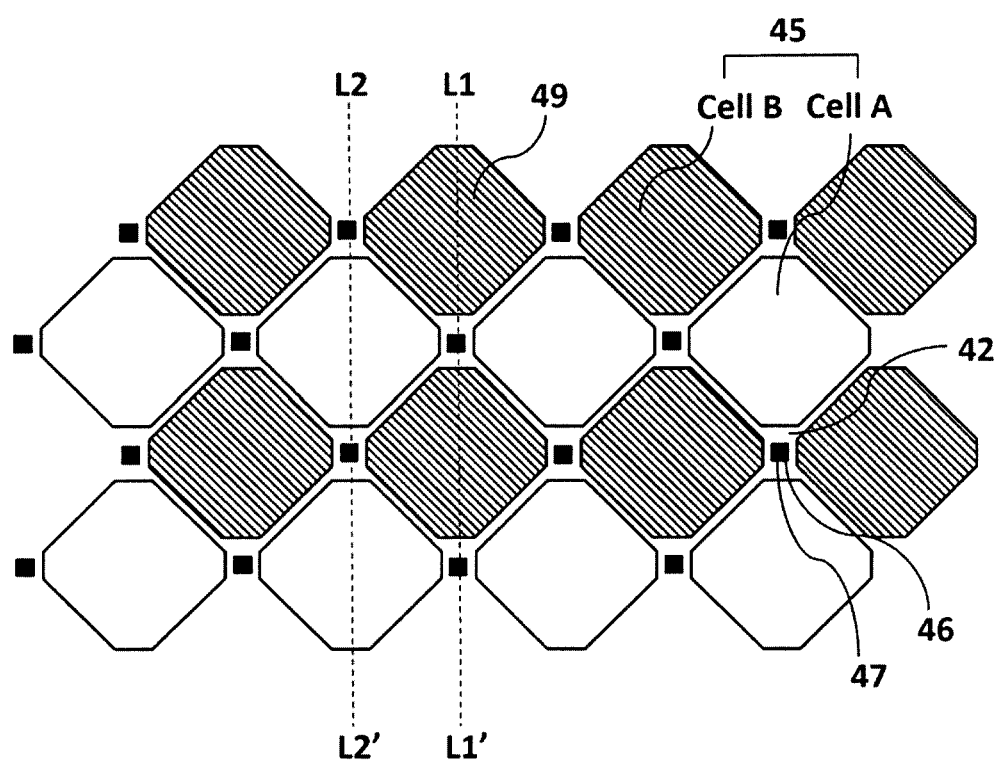
FIG. 6 is a projection drawing of a part of first cells, second cells, and partition walls of a honeycomb structure according to an embodiment of the present invention, as viewed from an inlet side in a cell extending direction (a gas flow direction).
Figure 7:
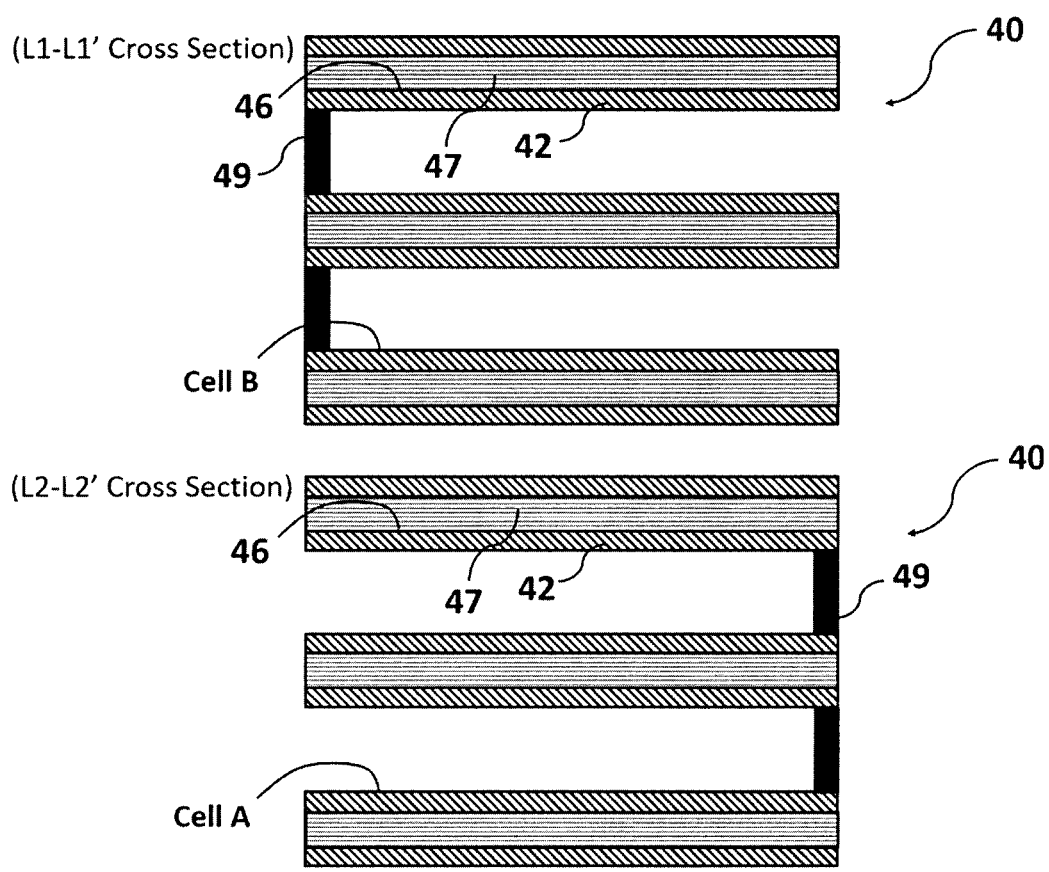
FIG. 7 is cross-sectional views schematically illustrating cross sections of a structure in which first cells of the honeycomb structure shown in FIG. 6 have plugged portions, taken along the line segment L1-L1' and the line segment L2-L2' represented by broken lines, respectively, which cross sections are each parallel to a cell extending direction (a gas flow direction).

FIG. 6 shows a projection drawing a part of first cells 45, second cells 46 filled with a material 47 containing a magnetic substance, and partition walls 42 of a honeycomb structure 40 according to an embodiment of the present invention, as viewed from the inlet side in the cell extending direction (gas flow direction). FIG. 7 shows cross-sectional views schematically showing cross sections of structures of the honeycomb structure 40 as shown in FIG. 6 where the first cells 45 have plugged portions 49, taken along the line segment L1-L1' and the line segment L2-L2' represented by broken lines, respectively, which cross sections are parallel to the cell extending direction (gas flow direction). As shown in FIGS. 6 and 7, the honeycomb structure 40 may have a structure having the first cells 45 including: a plurality of cells A in which the inflow side of the fluid is opened and the end face on the outflow side of the fluid has plugged portions 49; and a plurality of cells B which are arranged with alternately the cells A, and in which the outflow side of the fluid is opened and the end face on the inflow side of the fluid has the plugged portions 49. Such a honeycomb structure 40 can be used as a filter (honeycomb filter) for purifying an exhaust gas. Further, when the carbon fine particles in the exhaust gas are burned out and removed, the carbon fine particles can be burned out and removed by electric heating by forming the honeycomb structure having such plugged portions. It should be noted that the plugged portions 49 may have the same structures as those of the plugged portions of the conventionally known honeycomb structure. The plugged portions may be arranged after forming the outer peripheral coating, or they may be arranged before the outer peripheral coating, i.e., at the stage of producing the honeycomb structure 40.

Figure 9:
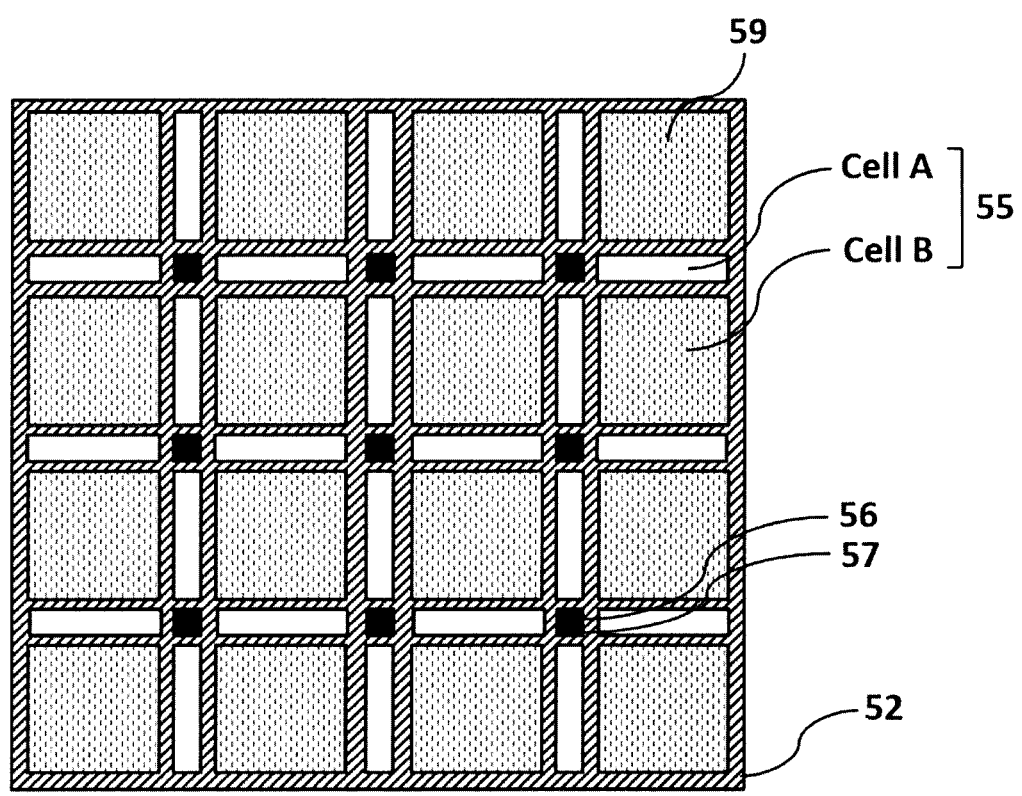
FIG. 9 is a projection drawing of a part of first cells, second cells, and partition walls of a honeycomb structure according to an embodiment of the present invention, as viewed from an inlet side in a cell extending direction (a gas flow direction).

FIG. 9 shows a projection drawing of a part of first cells 55, second cells 56 filled with a material 57 containing a magnetic substance, and partition walls 52 of a honeycomb structure according to an embodiment of the present invention, as viewed from the inlet side in the cell extending direction (gas flow direction). As shown in FIG. 9, the honeycomb structure may have a structure having the first cells 55 including: a plurality of cells A each having a rectangular cross section, in which the inflow side of the fluid is opened and the end face on the outflow side of the fluid has plugged portions 59; and a plurality of cells B which are arranged alternately with the cells A and have a substantially square cross section in which the outflow side of the fluid is opened and the end face on the inflow side of the fluid has the plugged portions 59. The cells A are formed to have a lower cross-sectional area than that of the cells B. Such a configuration can allow an area that will block the gas flow due to the magnetic substance to be reduced, so that the pressure loss can be reduced.

Figure 10:
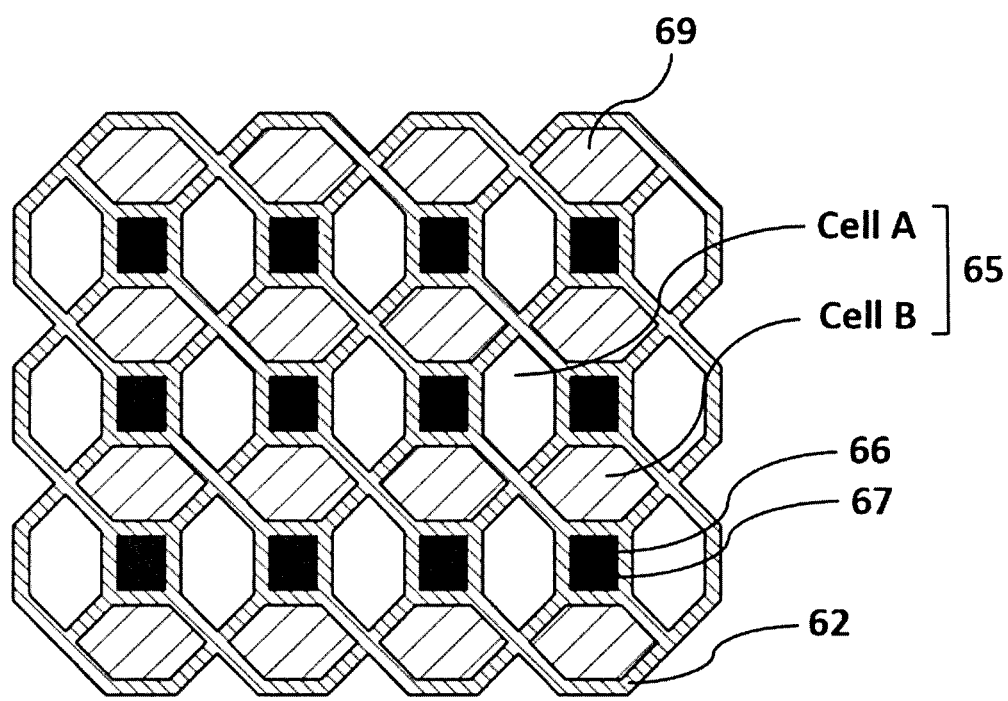
FIG. 10 is a projection drawing of a part of first cells, second cells, and partition walls of a honeycomb structure according to an embodiment of the present invention, as viewed from an inlet side in a cell extending direction (a gas flow direction).

FIG. 10 shows a projection drawing of a part of first cells 65, second cells 66 filled with a material 67 containing a magnetic substance, and partition walls 62 of a honeycomb structure according to an embodiment of the present invention, as viewed from the inlet side in the cell extending direction (gas flow direction). As shown in FIG. 10, the honeycomb structure may have a structure having the first cells 65 including: a plurality of cells A each having a hexagonal cross section, in which the inflow side of the fluid is opened and the end face on the outflow side of the fluid has plugged portions 69; and a plurality of cells B which are alternately arranged with the cells A and have a hexagonal cross section, and in which the outflow side of the fluid is opened and the end face on the inflow side of the fluid has the plugged portions 69. The cells A and the cells B have substantially the same cross-sectional area, but one of each cell A and each cell B has a vertically long hexagonal cross section, and the other has a horizontally long hexagonal cross section. Since the cells A and the cells B have the hexagonal cross section, the hydraulic diameter can be made higher than that of the square shape, so that the pressure loss can be reduced and the strength can also be improved.

Figure 11:
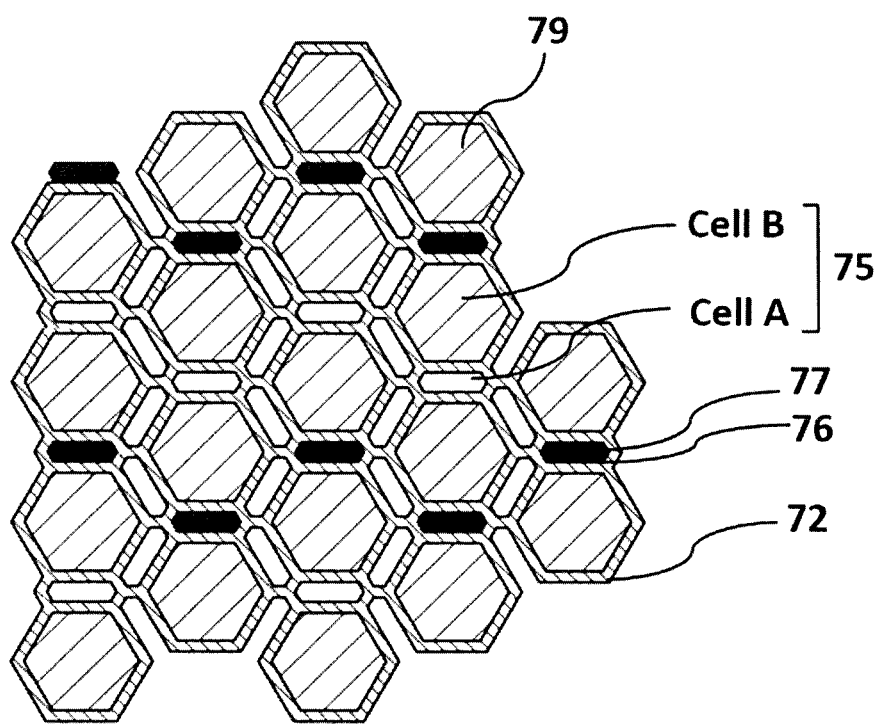
FIG. 11 is a projection drawing of a part of first cells, second cells, and partition walls of a honeycomb structure according to an embodiment of the present invention, as viewed from an inlet side in a cell extending direction (a gas flow direction).

FIG. 11 shows a projection drawing of a part of first cells 75, second cells 76 filled with a material 77 containing a magnetic substance, and partition walls 72 of a honeycomb structure according to an embodiment of the present invention, as viewed from the inlet side in the cell extending direction (gas flow direction). As shown in FIG. 11, the honeycomb structure may have a structure having the first cells 75 including: a plurality of cells A each having a hexagonal cross section in which the inflow side of the fluid is opened and the end face on the outflow side of the fluid has plugged portions 79; and a plurality of cells B which are alternately arranged with the cells A and have a hexagonal cross section, and in which the outflow side of the fluid is opened and the end face on the inflow side of the fluid has the plugged portions 79. One of each cell A and each cell B has a substantially regular hexagonal cross section, and the other has a horizontally long hexagonal cross section. Since the cells A and the cells B have the hexagonal cross section, the hydraulic diameter can be made higher than that of the square shape, so that the pressure loss can be reduced and the strength can also be improved.

Further, the cells A are formed to have a lower cross-sectional area than that of the cells B. Such a configuration can allow an area that will block the gas flow due to the magnetic substance to be reduced, so that the pressure loss can be reduced.

The honeycomb structure as shown in FIG. 11 is provided with horizontally long hexagonal cross-sectional regions each having a lower area so as to share the six sides of each cell B which is substantially regular hexagon and has a cross section with a higher area. That is, the total six horizontally long hexagonal cross-sectional regions each having a lower area are provided around the cell B, five of which form the cell A, and the remaining one forms the second cell 76 filled with the material 77 containing the magnetic substance.

Figure 12:
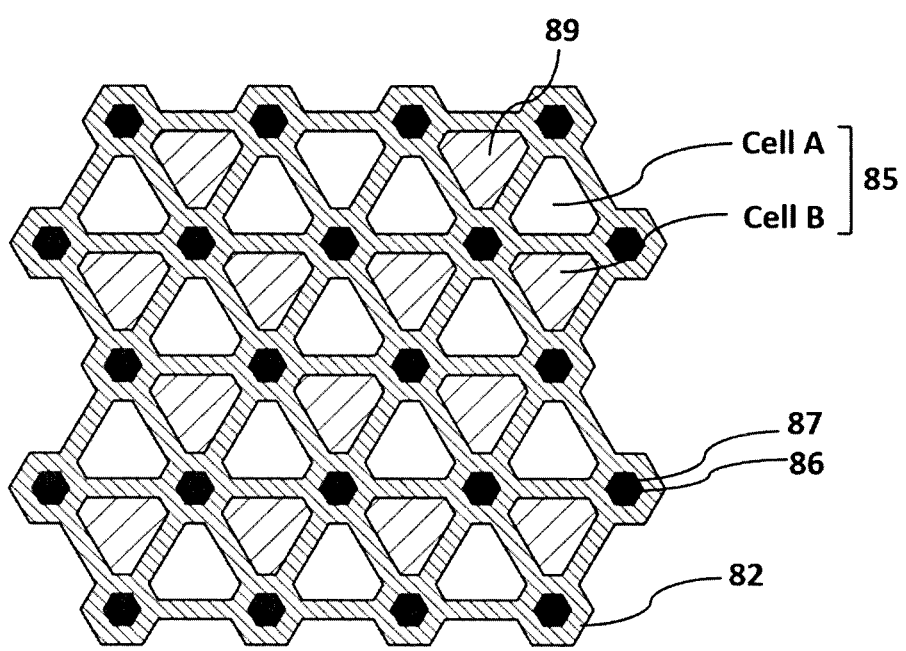
FIG. 12 is a projection drawing of a part of first cells, second cells, and partition walls of a honeycomb structure according to an embodiment of the present invention, as viewed from an inlet side in a cell extending direction (a gas flow direction).

FIG. 12 shows a projection drawing of a part of first cells 85, second cells 86 filled with a material 87 containing a magnetic substance, and partition walls 82 of a honeycomb structure according to an embodiment of the present invention, as viewed from the inlet side in the cell extending direction (gas flow direction). As shown in FIG. 12, the honeycomb structure may have a structure having the first cells 85 including: a plurality of cells A in which the inflow side of the fluid is opened and the end face on the outflow side of the fluid has plugged portions 89; and a plurality of cells B which are arranged alternately with the cells A, and in which the outflow side of the fluid is opened and the end face on the inflow side of the fluid has the plugged portions 89. The cells A and the cells B have a substantially triangular cross section with substantially the same size, but only one of each cell A and each cell B is formed to be an inverted triangle. The structure where the cells A and B each have the substantially triangular cross section results in improved strength. The cell A and the cell B are formed so as to share each apex of the substantially triangles in the cross section, and at the position of the apex, the second cell 86 having the hexagonal cross section and filled with the material 87 containing the magnetic substance is formed.

Figure 13:
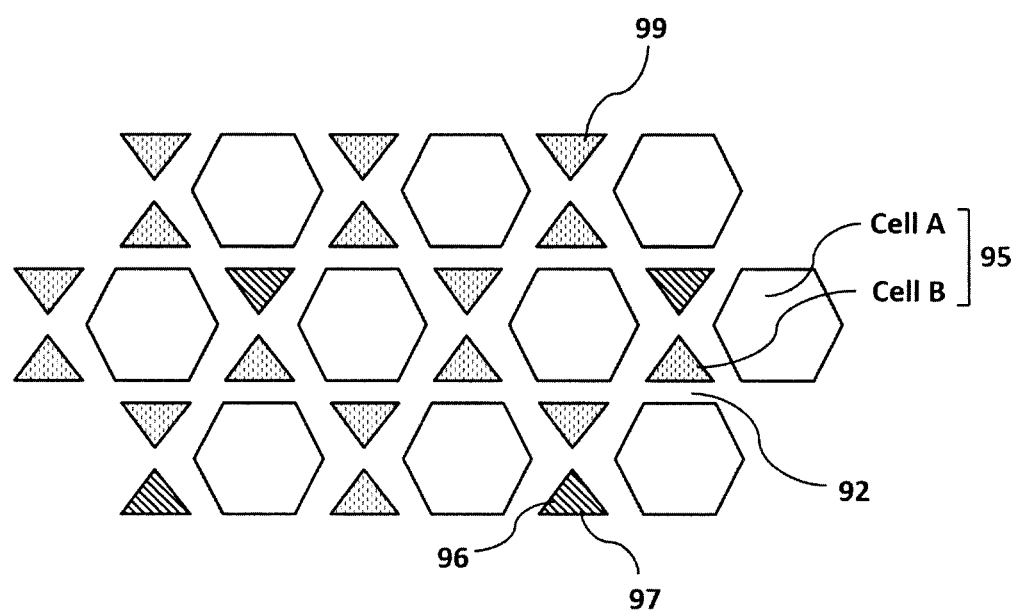
FIG. 13 is a projection drawing of a part of first cells, second cells, and partition walls of a honeycomb structure according to an embodiment of the present invention, as viewed from an inlet side in a cell extending direction (a gas flow direction).

FIG. 13 shows a projection drawing of a part of first cells 95, second cells 96 filled with a material 97 containing a magnetic substance, and partition walls 92 of a honeycomb structure according to an embodiment of the present invention, as viewed from the inlet side in the cell extending direction (gas flow direction). As shown in FIG. 13, the honeycomb structure may have a structure having the first cells 95 including: a plurality of cells A in which the inflow side of the fluid is opened and the end surface on the outflow side of the fluid has plugged portions 99; and a plurality of cells B which are arranged alternately with the cells A, and in which the outflow side of the fluid is opened and the end face on the inflow side of the fluid has the plugged portions 99. The cells A have a higher area and have a hexagonal cross section, and the cells B have a lower area than that of the cells A and have a triangular cross section. Between the cells A, cells having two triangular cross sections are arranged such that their apexes face each other, and both of the cells may form the cell B. Further, one may form the cell B and the other may form the second cell 96 filled with the material 97 containing the magnetic substance. According to such a configuration, the cells A can be made particularly larger, and a volume in which ash (ash components generated by combustion) can be deposited can be increased. As a result, the pressure loss after ash deposition can be reduced.

Figure 14:
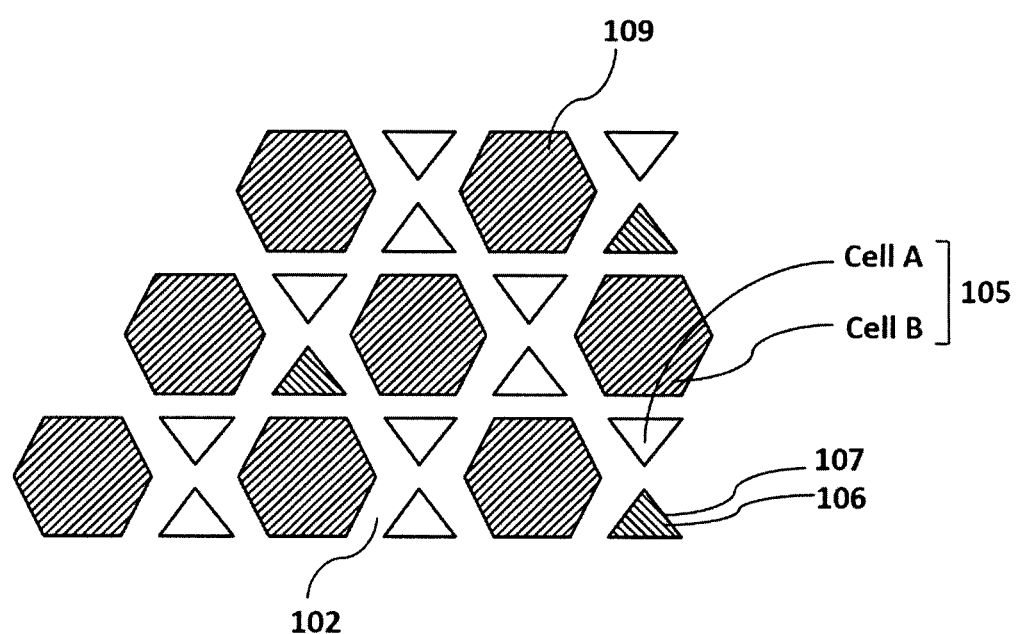
FIG. 14 is a projection drawing of a part of first cells, second cells, and partition walls of a honeycomb structure according to an embodiment of the present invention, as viewed from an inlet side in a cell extending direction (a gas flow direction).

FIG. 14 shows a projection drawing of a part of first cells 105, second cells 106 filled with a material 107 containing a magnetic substance, and partition walls 102 of a honeycomb structure according to an embodiment of the present invention, as viewed from the inlet side in the cell extending direction (gas flow direction). As shown in FIG. 14, the honeycomb structure may have a structure having the first cells 105 including: a plurality of cells A in which the inflow side of the fluid is opened and the end face on the outflow side of the fluid has plugged portions 109; and a plurality of cells B which are arranged alternately with the cells A, and in which the outflow side of the fluid is opened and the end face on the inflow side of the fluid has the plugged portions 109. The cells B has a higher area and a hexagonal cross section, and the cells A has a lower area than that of the cells B and has a triangular cross section. Between the cell B and the cell B, cells having two triangular cross sections are arranged such that their apexes face each other, and both of the cells may form the cell A. Further, one may form the cell A and the other may form the second cell 106 filled with the material 107 containing the magnetic substance. According to such a configuration, the cells B can be made particularly larger, and an initial pressure loss can be reduced by arranging those cells B on the filter outlet side.

Figure 15:
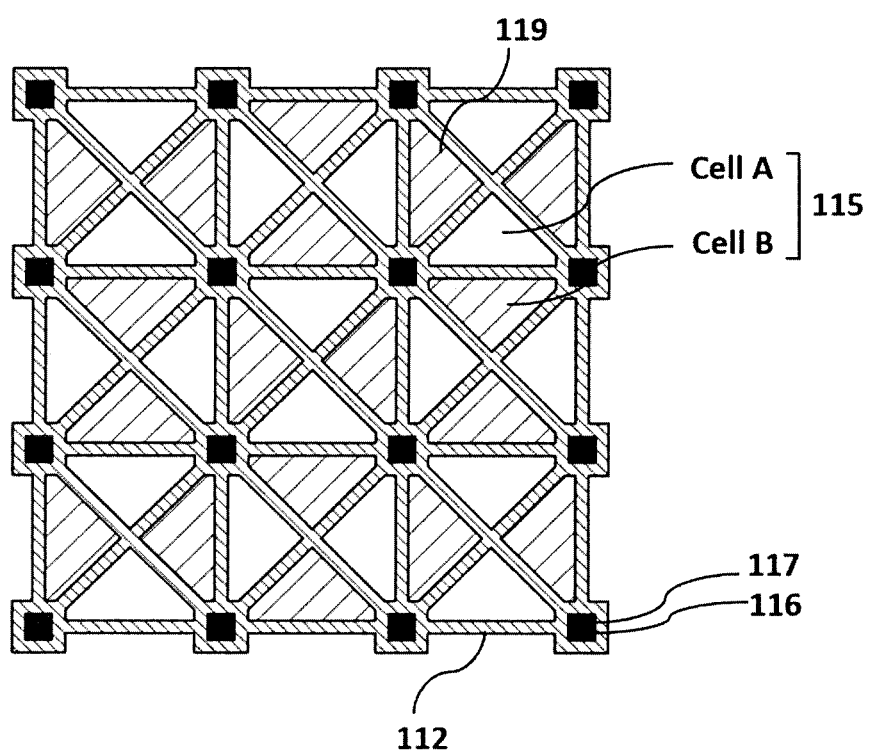
FIG. 15 is a projection drawing of a part of first cells, second cells, and partition walls of a honeycomb structure according to an embodiment of the present invention, as viewed from an inlet side in a cell extending direction (a gas flow direction).

FIG. 15 shows a projection drawing of a part of first cells 115, second cells 116 filled with a material 117 containing a magnetic substance, and partition walls 112 of a honeycomb structure according to an embodiment of the present invention, as viewed from the inlet side in the cell extending direction (gas flow direction). As shown in FIG. 15, the honeycomb structure may have a structure having the first cells 115 including: a plurality of cells A in which the inflow side of the fluid is opened and the end face on the outflow side of the fluid has plugged portions 119; and a plurality of cells B which are arranged alternately with the cells A, and in which the outflow side of the fluid is opened and the end face on the inflow side of the fluid has the plugged portions 119. The cells A and the cells B have a substantially triangular cross section with substantially the same size. The two cells A are arranged such that their apexes face each other, and the two cells B are arranged such that their apexes face each other. The four cells in total are arranged so as to share their respective apexes, and the four cells as a whole are arranged so as to be substantially square. Further, at positions of the apexes of the substantially square formed by all the four cells, the second cells 116 each having a substantially square cross section and filled with the material 117 containing the magnetic substance are arranged. According to such a configuration, the triangular truss structure is formed, so that the rigidity of the honeycomb can be increased.

(2. Exhaust Gas Purifying Device)

Figure 8:
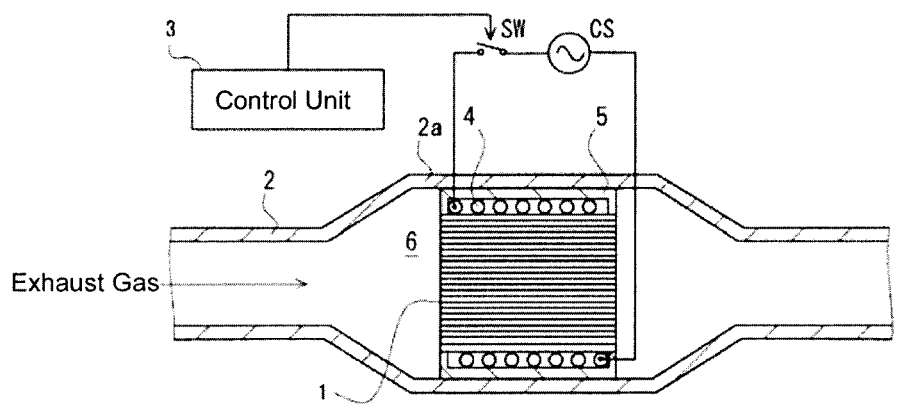
FIG. 8 is a schematic view of an exhaust gas flow path of an exhaust gas purifying device including a honeycomb structure according to an embodiment of the present invention.

FIG. 8 shows a schematic view of an exhaust gas flow path of an exhaust gas purifying device 6 including the honeycomb structure 1. The exhaust gas flow path of the exhaust gas purifying device 6 having the honeycomb structure 1 and a coil wiring 4 that spirally surrounds the outer circumference of the honeycomb structure 1 may be defined by a metal pipe 2. The exhaust gas purifying device 6 can be arranged in an increased diameter portion 2*a* of the metal pipe 2. The coil wiring 4 may be fixed to the interior of the metal pipe 2 by a fixing member 5. The fixing member 5 is preferably a heat-resistant member. The honeycomb structure 1 may support a catalyst.

The coil wiring 4 is spirally wound around the outer circumference of the honeycomb structure 1. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 1 is increased in response to the change of the magnetic field according to the alternating current flowing through the coil wiring 4. Based on this, carbon fine particles and the like collected by the honeycomb structure 1 are burned out. Also, when the honeycomb structure 1 supports the catalyst, the increase in the temperature of the honeycomb structure 1 raises a temperature of the catalyst supported by the catalyst support contained in the honeycomb structure 1 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

Figure 16:
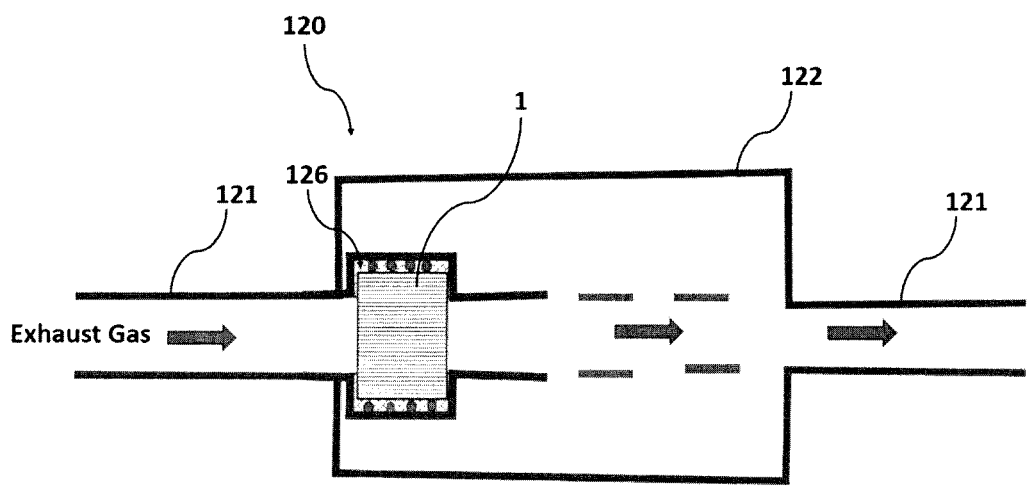
FIG. 16 is a schematic view of an exhaust system including a honeycomb structure according to an embodiment of the present invention provided in an exhaust muffler.

FIG. 16 shows a schematic view of an exhaust system 120 including an exhaust muffler 122 and an exhaust gas purifying device 126 provided in the exhaust muffler 122. The exhaust muffler 122 is provided with a silencer. The silencer may be composed of a plurality of silencers such as a main silencer and a sub silencer. The exhaust gas purifying device 126 has the honeycomb structure 1 incorporated therein, and includes the coil wiring that spirally surrounds the outer circumference of the honeycomb structure 1 and the fixing member for fixing the coil wiring to the interior of the exhaust gas flow path. The exhaust system 120 includes an exhaust pipe 121 that serves as a flow path for an exhaust gas fed to the exhaust muffler 122 or a flow path for an exhaust gas discharged from the exhaust muffler 122.

Figure 17:
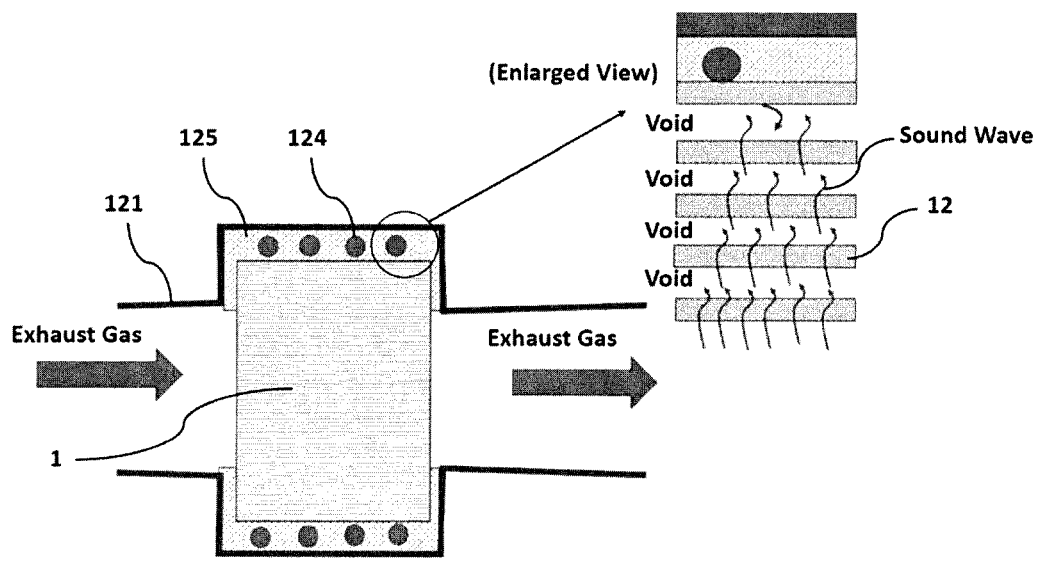
FIG. 17 is a schematic view of an exhaust gas purifying device according to an embodiment of the present invention provided in an exhaust muffler.

FIG. 17 shows a schematic view of the exhaust gas purifying device 126 provided in the exhaust muffler 122 of the exhaust system 120. FIG. 17 also shows a partially enlarged view of the vicinity of the coil wiring 124 embedded in a holding mat 125 of the exhaust gas purifying device 126, for explaining a muffling function. In the exhaust system 120, a lower temperature of a gas passing through the honeycomb structure 1 results in a lower deposition flow rate of the gas, whereby a velocity of the gas passing through the partition walls of the honeycomb structure 1 can be decreased. Therefore, it is preferable to arrange the honeycomb structure 1 as downstream as possible from the exhaust system 120 in terms of ensuring a soot collection efficiency. Further, it is preferable to provide the honeycomb structure 1 inside the main silencer located at the most downstream of the exhaust system 120 and an auxiliary muffler at the previous stage of the main silencer. If a conventional honeycomb structure is mounted in the exhaust muffler, only smaller pores of the partition walls of the honeycomb structure are plugged by liquid water based on the capillary phenomenon due to condensation of water. This causes problems that the soot collection efficiency is deteriorated because the gas flowing at a high velocity is concentrated on larger pores, and that the soot cannot be regenerated because the temperature of the exhaust gas is too low. On the other hand, since the honeycomb structure 1 can evaporate and remove water by electromagnetic induction heating, the honeycomb structure 1 can maintain a higher soot collection efficiency and can be heated to a temperature required for soot regeneration during soot regeneration. Therefore, the honeycomb structure 1 is difficult to cause the problem that the soot cannot be reproduced. The honeycomb structure 1 has pressure loss factors such as expansion and contraction of the gas, passage of the gas through the porous body, and passage of the gas through the cell flow paths, which have a silencing effect. Therefore, partial replacement of the muffling function in the silencer is possible. In order to enhance the effect of reducing the high frequency sound, it is further effective to confine the high frequency sound near the outer circumference of the exhaust muffler 122 and attenuate it therein, as shown in FIG. 17. As shown in FIG. 17, the cells near the outer circumference of the honeycomb structure have a structure in which both ends are plugged, so that sound waves are difficult to leak in the axial direction. As shown in the enlarged view of FIG. 17, the sound waves transmitted into the honeycomb structure 1 in the exhaust muffler 122 of the exhaust system 120 are transmitted through a gap between the partition wall 12 and the partition wall 12 of the honeycomb structure 1, and progress while being attenuated by the partition walls, and reflected by the outermost partition wall 12 in contact with the holding mat 125. Thus, the sound waves are suppressed from propagating to the outside. The honeycomb structure may have unplugged cells that are penetrated as shown in FIG. 17, or may be a wall flow type filter in which both ends are alternately plugged. From the viewpoint of silencing effect, the wall flow type filter in which both ends are alternately plugged is more preferable.

(3. Method for Producing Honeycomb Structure)

The method for producing the honeycomb structure will be described below.

First, the honeycomb structure having the porous partition walls and the plurality of first and second cells defined by the partition walls is produced. For example, when producing the honeycomb structure made of cordierite, a cordierite-forming raw material is firstly prepared as a material for a green body. The cordierite-forming raw material contains a silica source component, a magnesia source component, and an alumina source component, and the like, in order to formulate each component so as to have a theoretical composition of cordierite. Among them, the silica source component that can be used includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body (additive) to be added to the cordierite-forming raw material is then prepared. At least a binder and a pore former are used as additives. In addition to the binder and the pore former, a dispersant or a surfactant can be used.

The pore former that can be used includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used include at least one metal of iron, copper, zinc, lead, aluminum, and nickel, alloys mainly based on those metals (e.g., carbon steel, cast iron, or stainless steel, for iron), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 µm. Examples of a shape of the low melting point reactant include a spherical shape, a wound-lozenge shape, a konpeito shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

When the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material.

When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

The silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and $YVO_4$ laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

When supporting the catalyst into the first cells of the honeycomb structure, the printed portion is not deteriorated even after printing with the laser, and the printed portion can be read well even after supporting the catalyst. The method for supporting the catalyst is not particularly limited and can be carried out according to the method for supporting the catalyst carried out in the conventional method for producing the honeycomb structure.

The interior of each of the second cells of the honeycomb structure is filled with the material containing the magnetic substance. There are mainly three methods for filling the second cells with the material containing the magnetic substance, as follows:

- a method of pouring a slurry containing a magnetic substance and a binding material based on a metal or glass into the second cells of the honeycomb structure, and heating it at a temperature equal to or higher than a melting point of the metal or a softening point of the glass to solidify it;
- a method of pouring a slurry containing a magnetic substance and an adhesive material based on silica or alumina into the second cells of the honeycomb structure, and heating it to solidify silica or alumina; and
- a method of inserting a material containing a needle-shaped magnetic substance such as wires into the second cells of the honeycomb structure.

In order to pour the slurry into the second cells of the honeycomb structure, for example, the slurry may be circulated in the second cells of the honeycomb structure, or the second cells of the honeycomb structure are immersed in the slurry. Here, when the binding material based on the metal or glass is used, it is necessary to melt or soften the honeycomb substrate once at a temperature equal to or lower than a heat resistant temperature of the honeycomb substrate during the production. Therefore, the heating at a temperature equal to or lower than a melting point or a softening point of the binding material is preferable. Further, in the usage environment, the maximum temperature reaches about 700° C. Therefore, it is more preferable to use a metal or glass having a melting point or a softening point equal to or higher than that temperature. The specific melting point or softening point is, for example, from 800 to 1200° C. On the other hand, when the adhesive material based on silica or alumina is used, it is preferable that the adhesive material can be solidified by heating and drying during production. Examples of the adhesive material that can be solidified by heating and drying include a colloidal dispersion of silica or alumina, and may be a colloidal dispersion containing silica and alumina.

Further, since the maximum temperature in the usage environment reaches about 700° C., it is more preferable to use silica or alumina having a heat resistant temperature equal to or higher than that temperature. After pouring the slurry into the second cells of the honeycomb structure, a suction jig is attached to a downstream side of the honeycomb structure, and suction is performed from the other opening end side downstream of the honeycomb structure to remove excess water to fill the second cells with the material containing the magnetic substance. The material containing the magnetic substance is preferably heated under conditions of a temperature of 800 to 1200° C. for 0.5 to 3 hours.

When the adhesive material based on alumina or silica is used, the step of pouring the slurry into the cells may be performed at the stages of honeycomb formed body and the honeycomb dried body. In this case, after pouring the slurry into the second cells of the honeycomb structure, it is dried, and then, in the firing step of the honeycomb structure, the magnetic substance is fixed to the adhesive at the same time. The silica or alumina preferably exhibits the solidifying effect by drying.

In addition to addition of the binding material based on the metal or glass, the magnetic substance may be previously coated with the binding material based on the metal or glass. Further, a step of forming composite particles containing magnetic particles and a binding material may be provided.

The slurry can be obtained, for example, by mixing the magnetic substance, the adhesive material or the binding material, the organic binder, and water or alcohol. Further, an oil and fat, and a surfactant may be further added to the slurry, mixed and emulsified.

DESCRIPTION OF REFERENCE NUMERALS

1, 40 honeycomb structure
2 metal pipe
3 control unit
4, 124 coil wiring
5 fixing member
6, 126 exhaust gas purifying device
11 outer peripheral wall
12, 22, 32, 42, 52, 62, 72, 82, 92, 102, 112 partition wall
13 inflow end face
14 outflow end face
15, 25, 35, 45, 55, 65, 75, 85, 95, 105, 115 first cell
16, 26, 36, 46, 56, 66, 76, 86, 96, 106, 116 second cell
17, 27, 37, 47, 57, 67, 77, 87, 97, 107, 117 material containing magnetic substance
18 catalyst
49, 59, 69, 79, 89, 99, 109, 119 plugged portion
120 exhaust system
121 exhaust pipe
122 exhaust muffler
125 holding mat

The invention claimed is:

1. A pillar shaped honeycomb structure, comprising:
   a porous partition wall that defines a plurality of cells, the plurality of cells forming flow paths for a fluid, the plurality of cells extending from an inflow end face to an outflow end face; and
   an outer peripheral wall located at the outermost circumference;
   wherein the plurality of cells comprise:
      a plurality of first cells; and
      a plurality of second cells having a lower cross-sectional area than that of the plurality of first cells,
   wherein an interior of each of the second cells is filled with a material comprising a magnetic substance, and
   wherein each of the second cells are arranged adjacent to at least one of the first cells.

2. The honeycomb structure according to claim 1, wherein each of the first cells is arranged adjacent to at least one of the second cells.

3. The honeycomb structure according to claim 1,
   wherein each of the first cells has a polygonal opening, and
   wherein each of the second cells is arranged adjacent to at least one corner portion of the polygonal opening of each of the first cells.

4. The honeycomb structure according to claim 1, wherein a ratio of a cross-sectional area of the second cells to the total cross-sectional area of the first cells and the second cells is 10% or less.

5. The honeycomb structure according to claim 1, wherein the first cells and the second cells are arranged in a staggered pattern.

6. The honeycomb structure according to claim 1, wherein an equivalent hydraulic diameter of the first cells is at least twice that of the second cells.

7. The honeycomb structure according to claim 6, wherein the equivalent hydraulic diameter of the first cells is 5 times or more that of the second cells.

8. The honeycomb structure according to claim 1, wherein the magnetic substance has needle shape.

9. The honeycomb structure according to claim 1, wherein the magnetic substance has particulate shape.

10. The honeycomb structure according to claim 1, wherein the material comprising the magnetic substance further comprises glass.

11. The honeycomb structure according to claim 1, wherein the partition wall and the outer peripheral wall comprise a ceramic material.

12. The honeycomb structure according to claim 11, wherein the ceramic material is at least one of cordierite, silicon carbide, aluminum titanate, silicon nitride, mullite, or alumina.

13. The honeycomb structure according to claim 1, wherein the first cells comprise: a plurality of cells A wherein a side of the inflow end face is opened and the outflow end face has plugged portion; and a plurality of cells B which are arranged alternately with the cells A, wherein a side of the outflow end face is opened and the inflow end face has the plugged portion.

14. The honeycomb structure according to claim 1, wherein the magnetic substance in the second cells has a Curie point of 700° C. or more.

15. The honeycomb structure according to claim 1, wherein at least one catalyst of a three-way catalyst, an oxidation catalyst, an SCR catalyst, or an LNT catalyst is provided on surfaces of the porous partition wall forming inner walls of the first cells.

16. An exhaust gas purifying device, comprising:
the honeycomb structure according to claim 1; and
a coil wiring that spirally surrounds an outer circumference of the honeycomb structure.

17. An exhaust system, comprising:
an exhaust muffler;
the exhaust gas purifying device according to claim 16, the exhaust gas purifying device being provided in the exhaust muffler; and
a silencer provided in the exhaust muffler.

* * * * *